US010104517B2

(12) United States Patent
Nitsch et al.

(10) Patent No.: US 10,104,517 B2
(45) Date of Patent: Oct. 16, 2018

(54) METHOD FOR LOADING A PROFILE

(71) Applicant: GIESECKE+DEVRIENT MOBILE SECURITY GMBH, München (DE)

(72) Inventors: Nils Nitsch, Markt Schwaben (DE); Ulrich Huber, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/561,329

(22) PCT Filed: Mar. 24, 2016

(86) PCT No.: PCT/EP2016/000522
§ 371 (c)(1),
(2) Date: Sep. 25, 2017

(87) PCT Pub. No.: WO2016/150574
PCT Pub. Date: Sep. 29, 2016

(65) Prior Publication Data
US 2018/0063667 A1 Mar. 1, 2018

(30) Foreign Application Priority Data
Mar. 26, 2015 (DE) ......................... 10 2015 003 977

(51) Int. Cl.
*H04W 8/20* (2009.01)
*H04W 4/50* (2018.01)
(Continued)

(52) U.S. Cl.
CPC ............. *H04W 4/50* (2018.02); *H04W 4/001* (2013.01); *H04W 4/005* (2013.01); *H04W 4/70* (2018.02); *H04W 8/205* (2013.01)

(58) Field of Classification Search
CPC ..... H04W 8/205; H04W 4/005; H04W 60/00; H04W 12/06; H04W 8/183; H04W 12/04;
(Continued)

(56) References Cited

U.S. PATENT DOCUMENTS 9,451,461 B2  9/2016 Hartel et al.
9,706,512 B2  7/2017 Suh
(Continued)

FOREIGN PATENT DOCUMENTS

DE  102012018540 A1  3/2014
WO  2014171707 A1  10/2014

OTHER PUBLICATIONS

International Preliminary Report on Patentability from PCT Application No. PCT/EP2016/000522, dated Sep. 26, 2017.
(Continued)

*Primary Examiner* — Nathan Taylor
(74) *Attorney, Agent, or Firm* — Workman Nydegger

(57) ABSTRACT

A method for loading a profile for a mobile radio subscription from a data preparation server into a subscriber identity module, comprises the steps: (a) providing a profile at the data preparation server; (b) generating a single executable program code module of the profile provided according to (a), which program code module is arranged such that by executing the executable program code module the profile is installed in the subscriber identity module; (c') loading the single executable program code module into the subscriber identity module. A method for installing a profile in the subscriber identity module, comprises the steps: (d) sending an APDU command from the data preparation server to the subscriber identity module; (e) in reaction to a reception of the APDU command at the subscriber identity module,
(Continued)

executing the executable program code module and by executing installing the profile in the subscriber identity module.

5 Claims, 2 Drawing Sheets

(51) Int. Cl.
*H04W 4/00* (2018.01)
*H04W 4/70* (2018.01)

(58) Field of Classification Search
CPC ......... H04W 8/18; H04W 8/20; H04W 12/12; H04W 4/029; H04W 4/60; H04W 88/06; H04W 8/22
USPC .................................................. 455/419, 411
See application file for complete search history.

(56) References Cited

U.S. PATENT DOCUMENTS

| | | | | |
|---|---|---|---|---|
| 9,843,585 | B2* | 12/2017 | Haggerty | ............ H04L 63/0823 |
| 2012/0331292 | A1* | 12/2012 | Haggerty | ............ H04L 63/0272 |
| | | | | 713/168 |
| 2013/0227646 | A1* | 8/2013 | Haggerty | ............ H04L 63/0853 |
| | | | | 726/3 |
| 2014/0004827 | A1* | 1/2014 | O'Leary | ................. H04W 8/22 |
| | | | | 455/411 |
| 2015/0281957 | A1 | 10/2015 | Hartel et al. | |
| 2016/0057725 | A1 | 2/2016 | Suh | |

OTHER PUBLICATIONS

International Search Report from PCT Application No. PCT/EP2016/000522, dated Jun. 27, 2016.
Park et al., "Secure Profile Provisioning Architecture for Embedded UICC," 2013 International Conference on Availability, Reliability, and Security, Sep. 2, 2013, pp. 297-303.
"Embedded SIM Remote Provisioning Architecture, Version 1.1," GSM Association, Dec. 17, 2013, pp. 1-84.
"Remote Provisioning Architecture for Embedded UICC Technical Specification, Version 2.0," GSM Association, Oct. 13, 2014, pp. 1-293.

* cited by examiner

METHOD FOR LOADING A PROFILE

FIELD OF THE INVENTION

The invention relates to a method for loading a profile for a mobile radio subscription (subscription profile) into a subscriber identity module.

PRIOR ART

Within the framework of arranging a subscriber identity module a subscription profile must be loaded into the subscriber identity module. Change requests regarding the subscription profile (or also only profile for short) require the provision of a changed subscription profile. In the case of plug-in SIM cards the change can be performed by an exchange of the SIM card. Alternatively, a new subscription profile is loaded into the subscriber identity module, which is performed in particular for firmly soldered subscriber identity modules which cannot readily be exchanged. The managing of subscriptions, in particular by downloading subscription profiles and accompanying data into an eUICC, in general is also referred to as subscription management.

The technical specifications [1] 12FAST.13—Embedded SIM Remote Provisioning Architecture 17 Dec. 2013, GSMA and [2] SGP02—Remote-Provisioning-Architecture-for-Embedded-UICC-Technical-Specification-v2.0, 13 Oct. 2014, GSMA describe the download and installation of a subscription profile into an eUICC. [1] 12FAST.13, chapter 3 describes roles and functions by means of which a profile is loaded from a subscription management secure router SM-SR into an eUICC and is installed there. One function is an executable program code installed in the eUICC, which can be caused to be executed through a command corresponding to the function which is sent to the eUICC. [2] SGP02, chapter 3 describes the procedure required by protocol for downloading and installing a subscription profile into an eUICC.

According to [1] 12FAST.13 chapter 3.3.1.2.2 "Profile Download and Installation Function", a profile is downloaded into the eUICC with a "download" function. Beyond the "download", further accompanying functions are to be performed upon downloading the profile. According to [1] 12FAST.13 chapter 3.3.1.3.1 "ISD-P Creation Function" and [2] SGP02, chapter 3.1.1 "ISD-P Creation", "create" functions are employed to create a file structure, in particular the ISD-P, in the eUICC. According to [2] SGP02, chapter 3.1.3 "Download an Installation of the Profile", after creating the ISD-P a profile is downloaded and stored in the file structure, in particular the ISD-P. According to [1] 12FAST.13 chapter 3.3.1.2.3 "Profile Content Update Function" and 3.3.1.2.4 "Policy Rules Update Function", "update" functions are employed to carry out updates according to the newly downloaded profile. According to [1] 12FAST.13 chapter 3.3.1.3.4 "Profile Enabling Function" and [2] SGP02, chapter 3.2 "Profile Enabling", "enable" functions are performed to activate a downloaded profile, in particular an ISD-P, and to thereby make it usable for the user of the eUICC.

According to [1], [2], in addition to the "download" function, with which a profile is downloaded into an eUICC, at least the three additional functions "create", "update" and "enable" are thus to be employed. Each of these functions must be called up or sent with costs via an OTA (over the air) connection from the SM-SR to the eUICC. This means that for downloading 10 kilobytes of profile data into an eUICC approximately at least 20 kilobytes (i.e. about twice as much) of data must be sent from the SM-SR OTA to the eUICC.

It would be desirable to have a solution for managing subscription profiles, in which the amount of data sent to the subscriber identity module, in particular of the data sent in addition to the actual profile data, is reduced.

The document DE 10 2012 018 540 A1 of the prior art discloses a subscriber identity module having two subscription profiles between which one can switch. This allows a subscription change to be carried out largely without an OTA transmission of data.

SUMMARY OF THE INVENTION

The invention is based on the object of creating a method for loading a profile for a mobile radio subscription (subscription profile) into a subscriber identity module, which reduces the data amount to be transmitted OTA to the subscriber identity module.

This object is achieved by a method according to claim 1. Advantageous embodiments of the invention are stated in the dependent claims.

The method according to claim 1 is based on basic ideas that the profile is loaded in a single executable program code module into the subscriber identity module. As soon as after the loading a first (communication) APDU command arrives at the subscriber identity module, which inevitably will be the case some time, the program code module is executed and thereby the profile is installed. Sending specific installation commands like "create", "update", and "enable" to individual elementary files (EFs) of the subscriber identity module, with which a profile is installed conventionally, is not necessary.

More precisely, the method comprises the steps: a) providing a profile at the data preparation server; b) generating a single executable program code module (binary large object BLOB) of the profile provided according to a), which program code module is arranged such that by executing the executable program code module the profile is installed in the subscriber identity module; c') loading the single executable program code module into the subscriber identity module in order to load the profile.

Hence, according to claim 1, a method for profile loading with reduced OTA data amount is created.

A method for installing a profile, which was loaded according to claim 1, in the subscriber identity module accordingly comprises the following steps: d) sending an APDU command (preferably no installation command) from the data preparation server to the subscriber identity module; in reaction to a reception of the APDU command at the subscriber identity module, executing the executable program code module and by executing installing the profile in the subscriber identity module.

The executable program code module is selectively configured as an application program, in particular as a Java applet, in particular as a Java applet in the cap.file format. The CPU of the subscriber identity module executes the program code in reaction to the first (or perhaps also another) incoming APDU command and thereby installs the profile into the subscriber identity module.

Alternatively, the executable program code module is configured as a memory image of the profile, or as a combination of a program code (e.g. a universal interpreter) which is independent of the profile and installed on the subscriber identity module with a memory image of the profile. In reaction to the first (or perhaps also another)

incoming APDU command, the memory image is unfolded and thereby the profile is installed, or the independent program code (e.g. interpreter) interprets the memory image and installs the profile thereby.

The step c') of loading the program code module selectively comprises the following substeps: c'1) loading the executable program code module from the data preparation server into a secure router (e.g. subscription management secure router SM-SR); c'2) loading the executable program code module from the secure router (SM-SR) into the subscriber identity module.

Selectively, step a) is configured as: a) providing the profile from a network operator server to the data preparation server.

BRIEF DESCRIPTION OF THE DRAWINGS

Hereinafter the invention will be explained more closely on the basis of embodiment examples and with reference to the drawings, in which are shown.

DETAILED DESCRIPTION OF EMBODIMENT EXAMPLE

Figure 1:
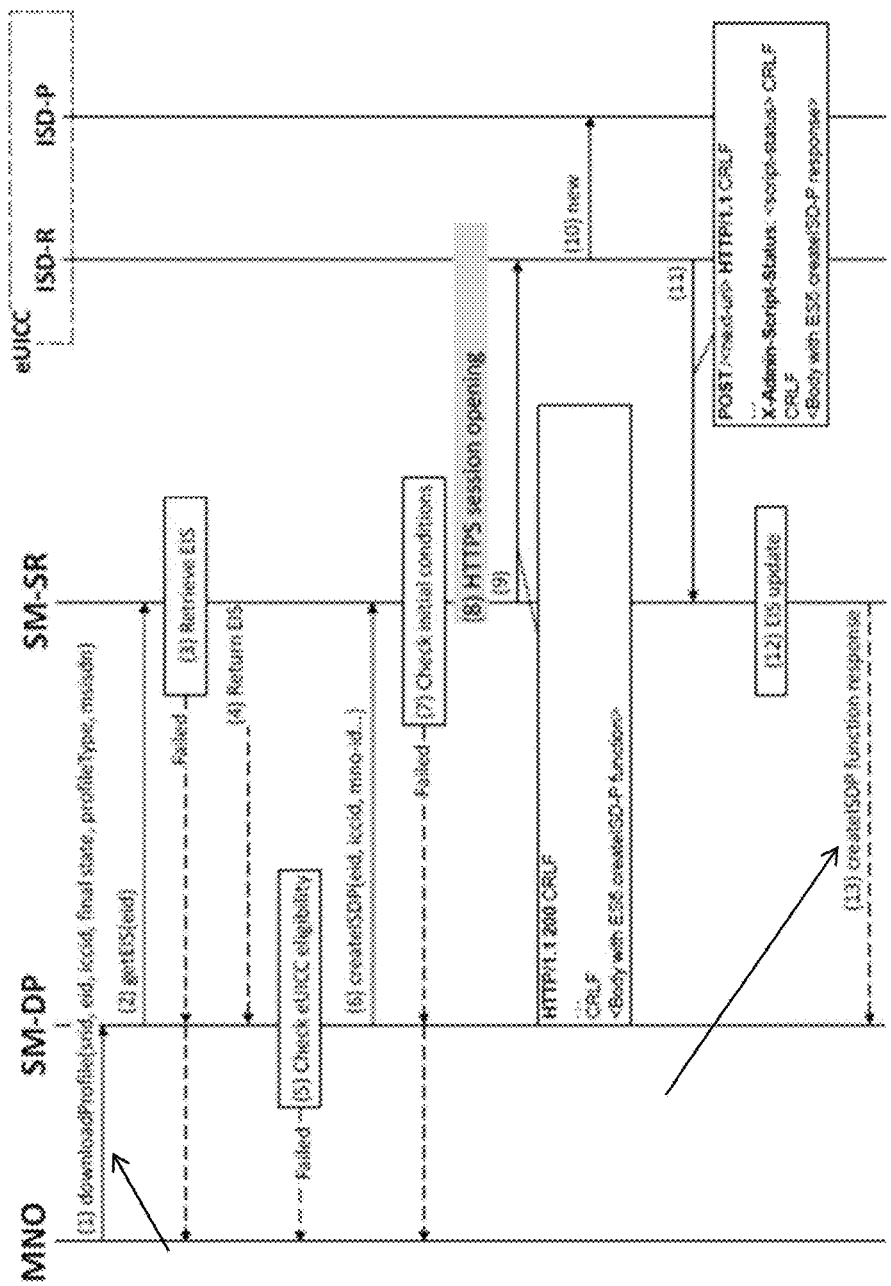
FIG. 1 the image of [2] chapter 3.1.1 FIG. 10 of the prior art.

FIG. 1 shows the image of [2] chapter 3.1.1 FIG. 10 of the prior art. A network operator MNO loads a profile into a subscriber identity module eUICC via the subman data preparation SM-DP and the subman secure router SM-SR in a plurality of steps with functions "download" and "create ISDP". Calling up the "download" function also provokes the execution of the "CreateISDP" function, in order to create a file structure into which profile data can be downloaded later. [2] Chapter 3.1.3 FIG. 12 shows the actual downloading of profile data after creation of the file structure ISD-P.

Figure 2:
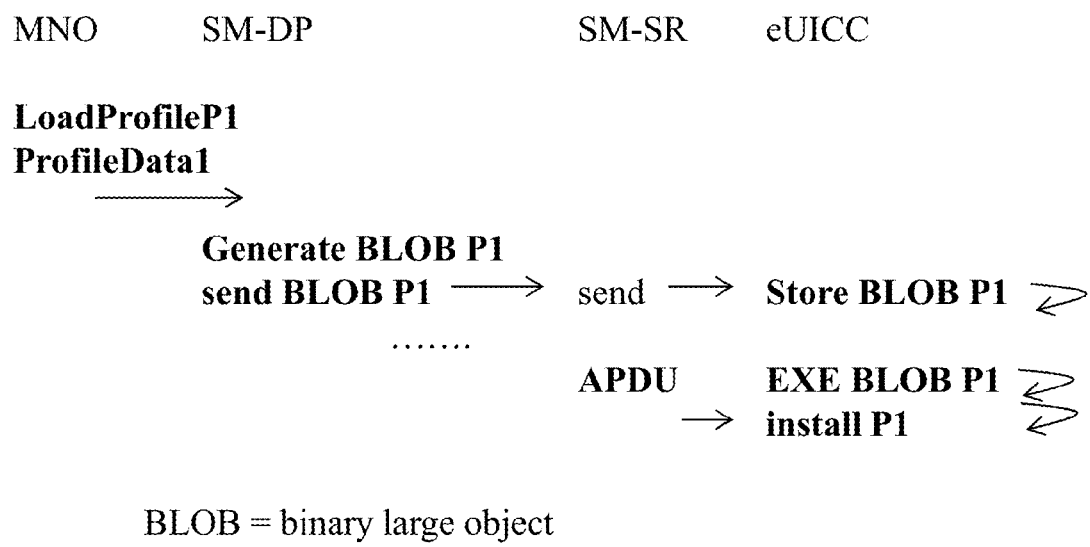
FIG. 2 the basic procedure of loading and installing an executable program code module BLOB for loading and installing a profile, according to an embodiment of the invention.

FIG. 2 shows the basic procedure of loading and installing an executable program code module BLOB (binary large object) for loading a profile P1 into a subscriber identity module eUICC and to install it there, according to an embodiment of the invention. The server of a network operator MNO (mobile network operator) provides profile structure and profile data of a profile P1 to the subman data preparation SM-DP server with the request to load the profile P1 into the subscriber identity module eUICC. The subman data preparation SM-DP server generates (pseudocode generate) an executable program code module BLOB P1 for the profile P1 and sends (pseudocode send) it to the subman secure router SM-SR which sends the executable program code module BLOB P1 on to the subscriber identity module eUICC. The subscriber identity module eUICC stores the executable program code module BLOB. At some time, the subman secure router SM-SR sends a first APDU command to the subscriber identity module eUICC. In reaction, the executable program code module BLOB is unfolded. Depending on the kind of executable program code module BLOB, the unfolding is done by executing the applet (FIG. 2: pseudocode EXE for execute), implementing or interpreting the memory image, etc. As a result, the profile P1 is installed in the subscriber identity module eUICC.

CITED PRIOR ART

[1] 12FAST.13—Embedded SIM Remote Provisioning Architecture 17 Dec. 2013, GSMA
[2] SGP02-Remote-Provisioning-Architecture-for-Embedded-UICC—Technical-Specification—v2.0, 13 Oct. 2014, GSMA
[3] DE 10 2012 018 540 A1

The invention claimed is:

1. A method for loading a profile for a mobile radio subscription from a data preparation server into a subscriber identity module, comprising the steps:
   a) providing a profile at the data preparation server;
   c) loading the profile into the subscriber identity module;
   wherein the steps:
   b) generating a single executable program code module of the profile provided according to a), which program code module is arranged such that by executing the executable program code module the profile is installed in the subscriber identity module;
   c') performing the step c) by loading the single executable program code module into the subscriber identity module;
   d) sending an application protocol data unit (APDU) command from the data preparation server to the subscriber identity module; and
   e) in reaction to a reception of the APDU command at the subscriber identity module, executing the executable program code module and by executing installing the profile in the subscriber identity module.

2. The method according to claim 1 wherein the executable program code module is configured as an application program.

3. The method according to claim 1, wherein the executable program code module is configured as a memory image of the profile or as a combination of a program code which is independent of the profile and installed on the subscriber identity module with a memory image of the profile.

4. The method according to claim 1, wherein c') comprises the following substeps:
   c'1) loading the executable program code module from the data preparation server into a secure router;
   c'2) loading the executable program code module from the secure router into the subscriber identity module.

5. The method according to claim 1, wherein step a) is configured: a) providing the profile from a network operator server to the data preparation server.

* * * * *